(12) United States Patent
Asai

(10) Patent No.: US 9,819,504 B2
(45) Date of Patent: Nov. 14, 2017

(54) INFORMATION PROCESSING APPARATUS, COOPERATION SYSTEM AND COMPUTER READABLE MEDIUM

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 142 days.

(21) Appl. No.: 14/671,057

(22) Filed: Mar. 27, 2015

(65) Prior Publication Data

US 2015/0381713 A1 Dec. 31, 2015

(30) Foreign Application Priority Data

Jun. 30, 2014 (JP) ................... 2014-134927

(51) Int. Cl.
*H04L 12/24* (2006.01)
*H04L 12/18* (2006.01)
*G06F 3/12* (2006.01)
*H04L 29/08* (2006.01)

(52) U.S. Cl.
CPC ........... *H04L 12/1822* (2013.01); *G06F 3/12* (2013.01); *H04L 67/14* (2013.01)

(58) Field of Classification Search
CPC ...... G06F 3/1294; G06F 3/121; G06F 3/1292; G06F 3/1236
USPC ........................................................ 709/205
See application file for complete search history.

(56) References Cited

U.S. PATENT DOCUMENTS

| | | | | |
|---|---|---|---|---|
| 6,609,162 | B1* | 8/2003 | Shimizu | H04L 12/24 709/203 |
| 2008/0055636 | A1* | 3/2008 | Namikata | H04N 1/00915 358/1.15 |
| 2009/0316206 | A1* | 12/2009 | Anezaki | H04N 1/32619 358/1.15 |
| 2013/0254297 | A1* | 9/2013 | Kobayashi | G06F 9/5044 709/205 |

FOREIGN PATENT DOCUMENTS

JP 2000-187573 A 7/2000

* cited by examiner

*Primary Examiner* — Ario Etienne
*Assistant Examiner* — Elizabeth Kassa
(74) *Attorney, Agent, or Firm* — Banner & Witcoff, Ltd.

(57) ABSTRACT

An information processing apparatus configured to control a cooperation operation that is to be executed by a first apparatus and a second apparatus, executes: determination processing of determining whether the target data associated with operation identification information for identifying the cooperation operation is stored in the storage unit when the operation unit receives a user operation of inputting a start instruction to start the cooperation operation; data transmitting processing of transmitting the target data to the second apparatus through the communication unit when it is determined in the determination processing that the target data is stored in the storage unit; and operation instruction processing of transmitting operation instruction information for executing the first operation to the first apparatus through the communication unit when it is determined in the determination processing that the target data is not stored in the storage unit.

9 Claims, 11 Drawing Sheets

*FIG.3A*

| COOPERATION OPERATION ID | APPARATUS ID | OPERATION CONTENT | FORMAT INFORMATION |
|---|---|---|---|
| 001 | SERVER A | DL | JPEG |
|  | MFC-C | PRINT | — |

*FIG.3B*

| COOPERATION OPERATION ID | APPARATUS ID | OPERATION CONTENT | FORMAT INFORMATION |
|---|---|---|---|
| 002 | MFC-A | SCAN | COLOR |
|  | MFC-B | PRINT | — |

*FIG.3C*

| COOPERATION OPERATION ID | TARGET DATA | FORMAT INFORMATION | RESUMPTION INFORMATION |
|---|---|---|---|
|  |  |  |  |

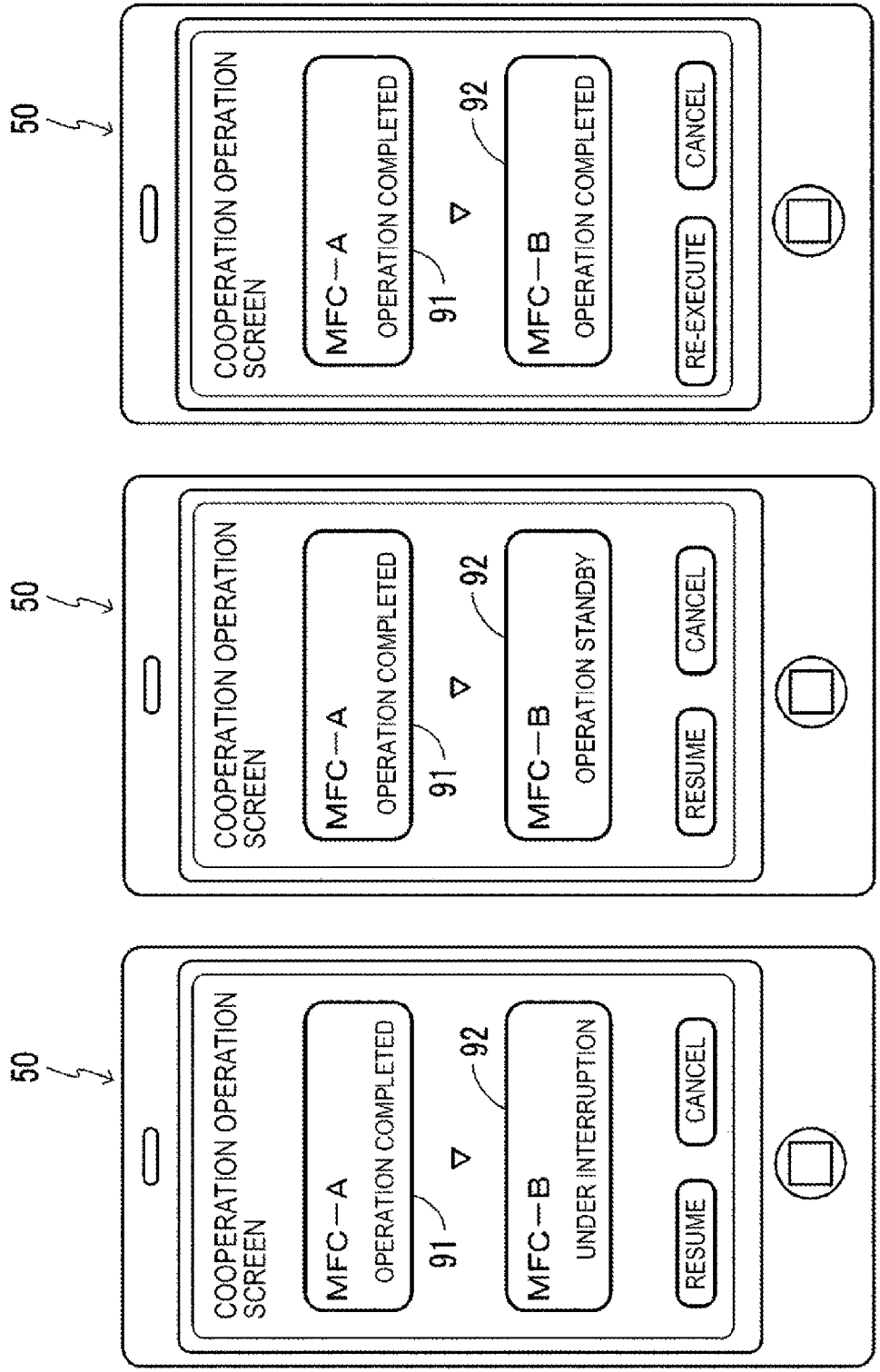

INFORMATION PROCESSING APPARATUS, COOPERATION SYSTEM AND COMPUTER READABLE MEDIUM

CROSS REFERENCE TO RELATED APPLICATION

This application is based upon and claims the benefit of priority of Japanese Patent Application No. 2014-134927 filed on Jun. 30, 2014, the contents of which are incorporated herein by reference in its entirety.

BACKGROUND

The present disclosure relates to a program for operating a plurality of apparatuses in cooperation with each other.

In the related art, an information processing apparatus has been known which is configured to operate (hereinafter, referred to as 'cooperation operation') an input apparatus and an output apparatus selected from a plurality of devices connected to a network in cooperation with each other. The information processing apparatus is configured to download target data from a storage server, which is an example of the input apparatus, and to cause a printer, which is an example of the output apparatus, to record an image represented by the target data on a recording sheet.

It cannot be said that the information processing apparatus can always perform communication with both the input apparatus and the output apparatus during the cooperation operation. For this reason, for example, there is a possibility that even though the target data has been received from the input apparatus, the target data cannot be transmitted to the output apparatus. In this case, if the cooperation operation should be performed again from the first, a throughput of the cooperation operation is lowered and a user may be required to perform an unnecessary operation.

SUMMARY

It is therefore an object of the present invention to provide a program capable of effectively re-executing a cooperation operation when the cooperation operation including processing of transmitting target data received from a first apparatus to a second apparatus is terminated.

A non-transitory computer readable recording medium storing a program for an information processing apparatus comprising a communication unit configured to perform communication with a plurality of apparatuses through a communication network, an operation unit configured to receive a user's operation and a storage unit, the information processing apparatus being configured to control a cooperation operation that is to be executed by a first apparatus and a second apparatus selected from the plurality of apparatuses, wherein the cooperation operation causes the first apparatus to execute a first operation including transmitting target data to the information processing apparatus, and causes the second apparatus to execute a second operation including receiving the target data from the information processing apparatus after the first operation, the computer program when executed by a processor of the information processing apparatus causing the information processing apparatus to execute:

determination processing of determining whether the target data associated with operation identification information for identifying the cooperation operation is stored in the storage unit when the operation unit receives a user' operation of inputting a start instruction to start the cooperation operation;

data transmitting processing of transmitting the target data to the second apparatus through the communication unit when it is determined in the determination processing that the target data is stored in the storage unit; and operation instruction processing of transmitting operation instruction information for executing the first operation to the first apparatus through the communication unit when it is determined in the determination processing that the target data is not stored in the storage unit.

A non-transitory computer readable recording medium storing a program for an information processing apparatus comprising a communication unit configured to perform communication with a plurality of apparatuses through a communication network, an operation unit configured to receive a user's operation and a storage unit, the information processing apparatus being configured to control a cooperation operation that is to be executed by a first apparatus and a second apparatus selected from the plurality of apparatuses, wherein the cooperation operation causes the first apparatus to execute a first operation including transmitting target data to the information processing apparatus, and causes the second apparatus to execute a second operation including receiving the target data from the information processing apparatus after the first operation, the computer program when executed by a processor of the information processing apparatus causing the information processing apparatus to execute:

data receiving processing of receiving the target data from the first apparatus through the communication unit when the operation unit receives a user' operation of inputting a start instruction to start the cooperation operation, storing control processing of associating the target data received in the data receiving processing with operation identification information for identifying the cooperation operation and storing the same in the storage unit when the cooperation operation is terminated in a state that reception of the target data from the first apparatus is completed and transmission of the target data to the second apparatus is not completed, inquiry processing of asking a user whether to execute the cooperation operation by using the target data stored in the storage unit in the storing control processing, and data transmitting processing of transmitting the target data stored in the storage unit to the second apparatus through the communication unit when the operation unit receives an execution instruction to execute the cooperation operation in the inquiry processing.

An information processing apparatus configured to control a cooperation operation that is to be executed by a first apparatus and a second apparatus selected from a plurality of apparatuses, wherein the cooperation operation is to cause the first apparatus to execute a first operation including transmitting target data to the information processing apparatus, and is to cause the second apparatus to execute a second operation including receiving the target data from the information processing apparatus, after the first operation, wherein the information processing apparatus comprises:

a communication unit configured to perform communication with the plurality of apparatuses through a communication network;

an operation unit configured to receive a user's operation;

a processor; and a storage unit storing a computer readable program, when executed by the processor, causing the information processing apparatus to execute:

determination processing of determining whether the target data associated with operation identification information for identifying the cooperation operation is stored in the storage unit when the operation unit receives a user' operation of inputting a start instruction to start the cooperation operation;

data transmitting processing of transmitting the target data to the second apparatus through the communication unit when it is determined in the determination processing that the target data is stored in the storage unit; and operation instruction processing of transmitting operation instruction information for executing the first operation to the first apparatus through the communication unit when it is determined in the determination processing that the target data is not stored in the storage unit.

A cooperation system comprising:
a first apparatus;
a second apparatus, and
an information processing apparatus configured to control a cooperation operation that is to be executed by the first apparatus and the second apparatus, wherein the cooperation operation is to cause the first apparatus to execute a first operation including transmitting target data to the information processing apparatus, and is to cause the second apparatus to execute a second operation including receiving the target data from the information processing apparatus after the first operation, wherein the information processing apparatus comprises:
a communication unit configured to perform communication with the plurality of apparatuses through a communication network;
an operation unit configured to receive a user's operation,
a processor;
a storage unit storing a computer readable program, when executed by the processor, causing the information processing apparatus to execute:

determination processing of determining whether the target data associated with operation identification information for identifying the cooperation operation is stored in the storage unit when the operation unit receives a user' operation of inputting a start instruction to start the cooperation operation;

data transmitting processing of transmitting the target data to the second apparatus through the communication unit when it is determined in the determination processing that the target data is stored in the storage unit; and operation instruction processing of transmitting operation instruction information for executing the first operation to the first apparatus through the communication unit when it is determined in the determination processing that the target data is not stored in the storage unit.

According to the above configuration, when the target data associated with the operation identification information of the cooperation operation, which is to start by the start instruction, is already stored in the storage unit, the target data is transmitted to the second apparatus. Thereby, it is possible to effectively re-execute the cooperation operation, which has been terminated after the target data was received from the first apparatus. In the meantime, the target data stored in the storage unit is different from target data received from the first apparatus and temporarily stored in a temporary memory.

According to the program described in the specification, when the target data associated with the operation identifier of the cooperation operation, which is to start by the start instruction, is already stored in the storage unit, the target data is transmitted to the second apparatus. Therefore, it is possible to effectively re-execute the cooperation operation, which has been terminated after the target data was received from the first apparatus.

BRIEF DESCRIPTION OF DRAWINGS

FIGS. 3A to 3C show examples of data to be stored in a data storage area 62B, in which FIGS. 3A and 3B show a cooperation operation list, and FIG. 3C shows associated cooperation operation ID, target data, format information and resumption information.

FIGS. 8A and 8B illustrates display examples of a display unit 53, in which FIG. 8A illustrates a correction receiving screen and FIG. 8B illustrates a cooperation operation selection screen.

FIGS. 9A and 9B illustrates display examples of the display unit 53, in which FIG. 9A illustrates an inquiry screen and FIG. 9B illustrates a cooperation operation screen.

FIGS. 10A to 10C illustrates display examples of the display unit 53, in which FIG. 10A illustrates the cooperation operation screen that is displayed when the cooperation operation is interrupted during execution of a second operation, FIG. 10B illustrates the cooperation operation screen that is displayed when the cooperation operation is interrupted before the execution of the second operation, and FIG. 10C illustrates the cooperation operation screen that is displayed when the cooperation operation is normally completed.

DESCRIPTION OF ILLUSTRATIVE EMBODIMENTS

Hereinafter, an illustrative embodiment of the present invention will be described with reference to the drawings. Meanwhile, the illustrative embodiment, which will be described later, is just an example of the present invention, and the illustrative embodiment of the present invention can be appropriately changed without changing the gist of the present invention.

Figure 1:
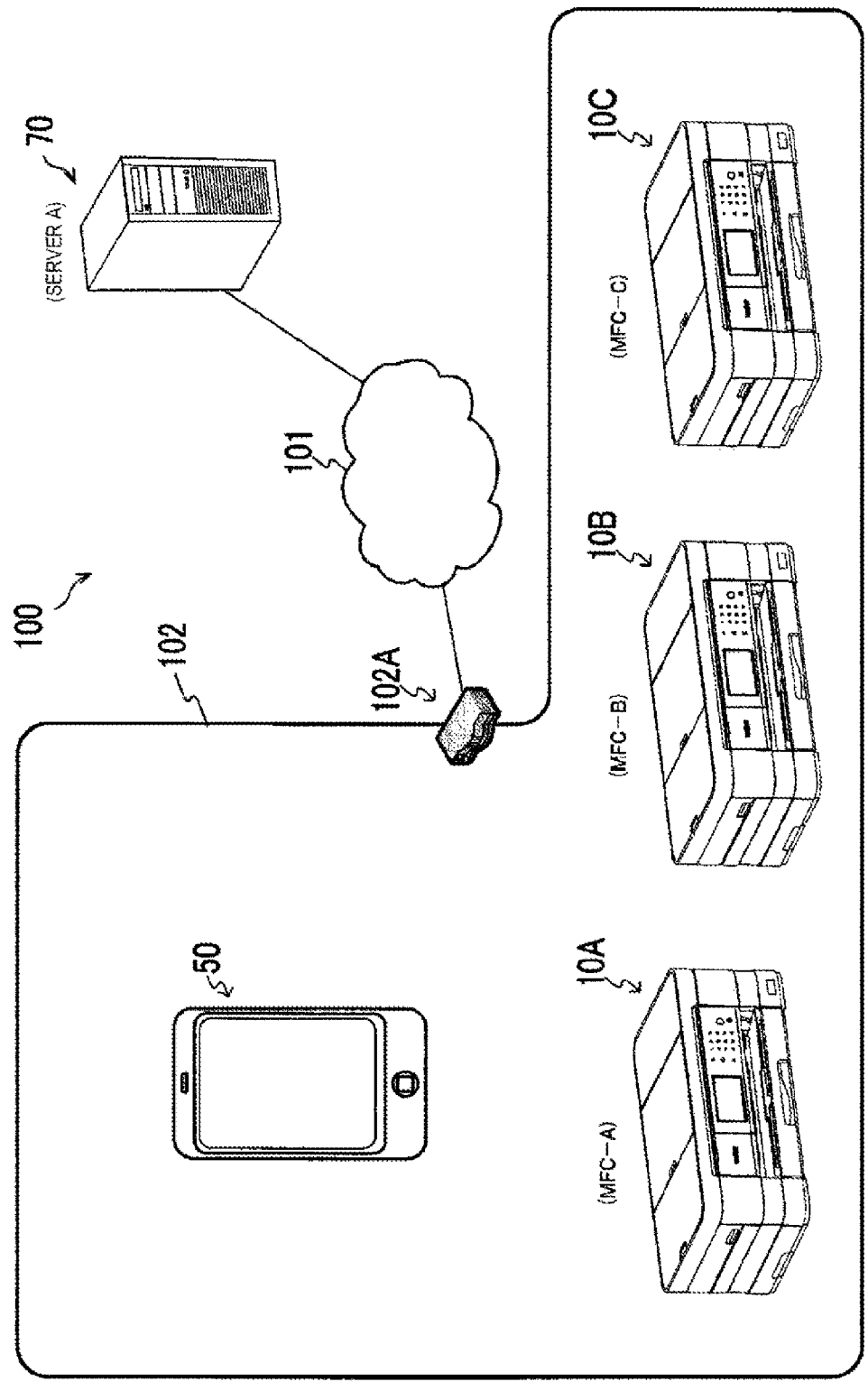
FIG. 1 is a schematic view of a cooperation system 100 of an illustrative embodiment.

FIG. 1 is a schematic view of a cooperation system 100 of an illustrative embodiment. The cooperation system 100 shown in FIG. 1 includes one or more complex machines 10A, 10B, 10C (hereinafter, also collectively referred to as 'complex machine 10'), a portable terminal 50, and one or more server apparatuses 70. The complex machines 10A, 10B, 10C, the portable terminal 50 and the server apparatus 70 are configured to perform communication with each other through a communication network. Although a specific example of the communication network is not particularly limited, the communication network of this illustrative embodiment includes the Internet 101, and a LAN (abbreviation of Local Area Network) 102 connected to the Internet 101.

In the example of FIG. 1, the LAN 102 is connected to the Internet 101 through a router 102A and the like. The complex machine 10 and the portable terminal 50 belong to the LAN 102, and the server apparatus 70 is connected to the Internet 101. In the meantime, the description 'belonging to the LAN 102' means, for example, that a setting for belonging to the LAN 102 is made for an apparatus, and the apparatus can perform communication with another apparatus belonging to the LAN 102, more specifically, the apparatus is provided with a network address allotted to the LAN 102.

The complex machines 10A, 10B, 10C and the server apparatus 70 are allotted with apparatus IDs for uniquely identifying the respective apparatuses. In this illustrative embodiment, an apparatus ID of the complex machine 10A is "MFC-A", an apparatus ID of the complex machine 10B is "MFC-B", an apparatus ID of the complex machine 10C is "MFC-C", and an apparatus ID of the server apparatus 70 is "server A". The complex machines 10A, 10B, 10C and the server apparatus 70 are examples of the plurality of apparatuses.

The apparatus included in the cooperation system 100 is not limited to the complex machine 10 and the server apparatus 70, and may be a dedicated machine such as a FAX apparatus, a printer, a 3D printer, a label printer, a sewing machine, a machine tool, a scanner, a camera and the like. In the meantime, the complex machine 10 and server apparatus 70 of the specific examples of the apparatus are examples of the apparatus that can be any of a first apparatus and a second apparatus, which will be described later. The FAX apparatus, the scanner and the camera are examples of the apparatus that can be only the first apparatus. The printer, the 3D printer, the label printer, the sewing machine and the machine tool are examples of the apparatus that can be only the second apparatus.

Complex Machine 10

Figure 2A:
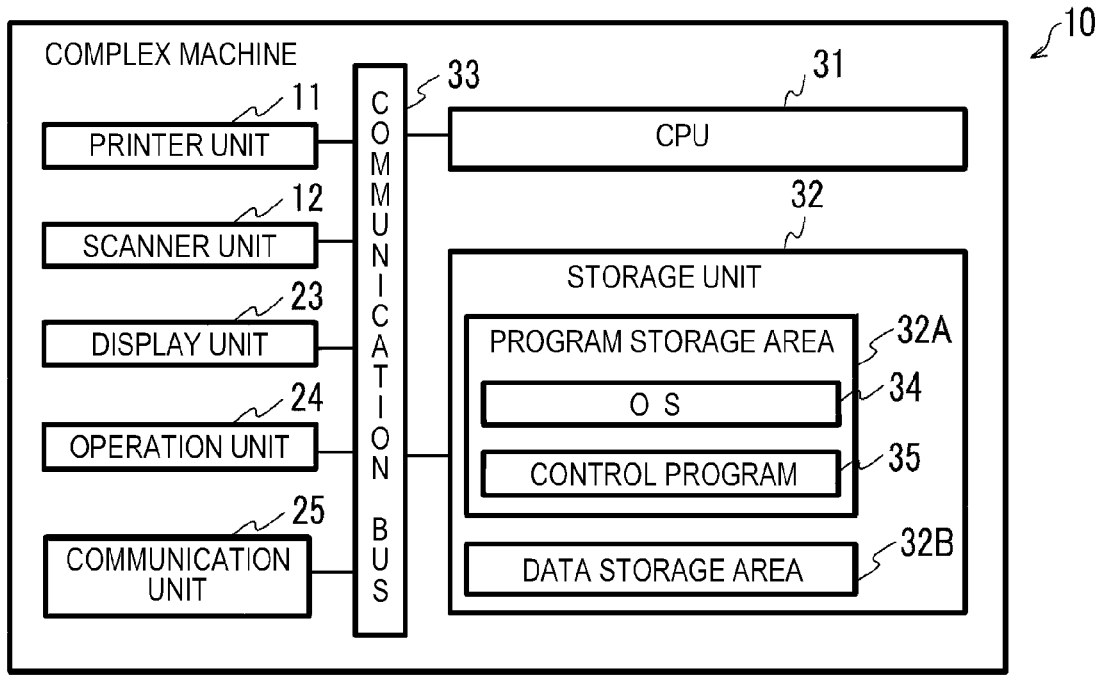
FIG. 2A is a block diagram of a complex machine 10.

As shown in FIG. 2A, the complex machine 10 mainly has a printer unit 11, a scanner unit 12, a display unit 23, an operation unit 24, a communication unit 25, a CPU (abbreviation of Central Processing Unit) 31, a storage unit 32 and a communication bus 33. The respective constitutional elements configuring the complex machine 10 are connected to each other via a communication bus 33. The configurations of the complex machines 10A, 10B, 10C may be common or may be partially different.

Printer Unit 11, Scanner Unit 12

The printer unit 11 is configured to execute recording processing of recording an image represented by image data onto a recording sheet. Although a recording method of the printer unit 11 is not particularly limited, a well-known method such as an inkjet method and an electrophotographic method may be adopted. The scanner unit 12 is configured to execute scan process of reading an image recorded on a recording sheet and generating image data. The complex machine 10 may further have a FAX function of transmitting and receiving facsimile data, a copy function of reading an image recorded on a recording sheet and recording the same onto another recording sheet, and the like.

Display Unit 23

The display unit 23 has a display screen for displaying a variety of information. Although a specific configuration of the display unit 23 is not particularly limited, an LCD (abbreviation of Liquid Crystal Display), an OLED (abbreviation of Organic Electro-Luminescence Display) and the like may be adopted.

Operation Unit 24

The operation unit 24 is configured to receive a user's operation of selecting an object displayed on the display screen of the display unit 23. Specifically, the operation unit 24 has push buttons, for example, and is configured to output a variety of operation signals associated with the pressed push buttons to the CPU 31. Further, the operation unit 24 may have a film-shaped touch sensor superimposed on the display screen of the display unit 23. That is, the display unit 23 may be configured as a touch panel display. As the touch sensor, a well-known method such as an electrostatic capacitance type, a resistance film type and the like may be adopted.

In the meantime, the term 'object' indicates an image that can be selected by a user's operation on the operation unit 24. For example, the object is a character string displayed on the display unit 23. When a direction key of the operation unit 24 is pressed, one of the objects may be highlighted, and when an enter button of the operation unit 24 is pressed, the highlighted object may be selected. As another example, when the operation unit 24 is configured as a touch panel, the object may be an icon, a button, a link and the like displayed on the display unit 23, and the object displayed on a tap position may be selected.

Communication Unit 25

The communication unit 25 is an interface for performing communication with an external apparatus through the communication network. In this illustrative embodiment, the communication unit 25 is configured to perform communication with an external apparatus, based on the TCP/IP (abbreviation of Transmission Control Protocol/Internet Protocol) protocol. That is, the complex machine 10 is configured to transmit a variety of information to the portable terminal 50 through the communication unit 25 and to receive a variety of data or information from the portable terminal 50 through the communication unit 25.

CPU 31

The CPU 31 is configured to control an entire operation of the complex machine 10. The CPU 31 is configured to acquire and execute a variety of programs (which will be described later) from the storage unit 32, based on the variety of information output from the operation unit 24 and the variety of information acquired from the external apparatus through the communication unit 25. That is, the CPU 31 and the storage unit 32 configure an example of the control unit.

Storage Unit 32

The storage unit 32 has a program storage area 32A and a data storage area 32B. The program storage area 32A is configured to store therein an OS (abbreviation of Operating System) 34 and a control program 35. In the meantime, the control program 35 may be a single program or a combination of a plurality of programs. The data storage area 32B is configured to store therein data or information, which is required to execute the control program 35.

In the meantime, the 'data' and 'information' in the specification have a common feature that 'data' and 'information' are bits or bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

The 'data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

In the specification, the 'data' and 'information' before and after a predetermined calculation is applied thereto may be handled as the same data and information. For example, it is assumed that unencrypted key information is stored in the storage unit and encrypted key information (hereinafter, referred to as 'encrypted key information') is received through the communication unit 25. In this case, when the key information stored in the storage unit coincides with decrypted key information obtained by decrypting the encrypted key information, the key information, the encrypted key information and the decrypted key information may be handled as the same 'key information'. In the meantime, the predetermined calculation is not limited to encryption/decryption and may be a calculation using a Hash function, for example.

However, the distinction of the 'data' and 'information' is not strict, and an exceptional handling is also allowed. For example, the data may be temporarily handled as the information, and the information may be temporarily handled as the data. One that is handled as the data in an apparatus may be handed as the information in another apparatus. Further, the information may be extracted from the data, and the data may be extracted from the information.

The storage unit 32 is configured by a RAM (abbreviation of Random Access Memory), a ROM (abbreviation of Read Only Memory), an EEPROM (abbreviation of Electrically Erasable Programmable Read-Only Memory), an HDD (abbreviation of Hard Disk Drive), a buffer provided for the CPU 31 or a combination thereof.

In the meantime, the storage unit 32 may be a computer-readable storage medium. The computer-readable storage medium is a non-transitory medium. The non-transitory medium includes a recording medium such as a CD-ROM and a DVD-ROM, too. The non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in the specification, the operations of each program may be described while omitting the CPU 31. That is, in below descriptions, the description 'program A is configured to execute processing A' may indicate that 'CPU 31 is configured to execute processing A described in the program A'. This is also the same for the portable terminal 50 and server apparatus 70, which will be described later.

The OS 34 is a basic program for providing an API (abbreviation of Application Programming Interface) configured to control the printer unit 11, the scanner unit 12, the display unit 23, the operation unit 24, the communication unit 25 and the like, which are the hardware configuring the complex machine 10. That is, each program described above is configured to call the API provided by the OS 34, thereby controlling the respective hardware. However, in the specification, the operations of each program are described while omitting the OS 34. That is, in below descriptions, the description 'program B is configured to control hardware C' may indicate that 'program B is configured to control hardware C through the API of the OS 34'. This is also the same for the portable terminal 50 and server apparatus 70, which will be described later.

Portable Terminal 50

Figure 2B:
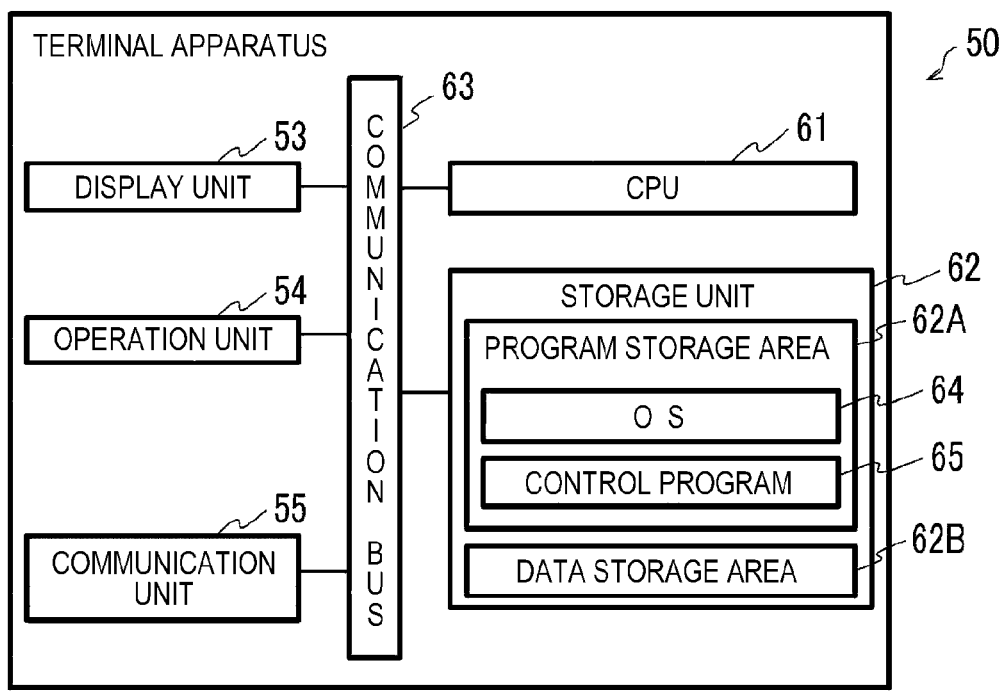
FIG. 2B is a block diagram of a portable terminal 50.
Figure 4:
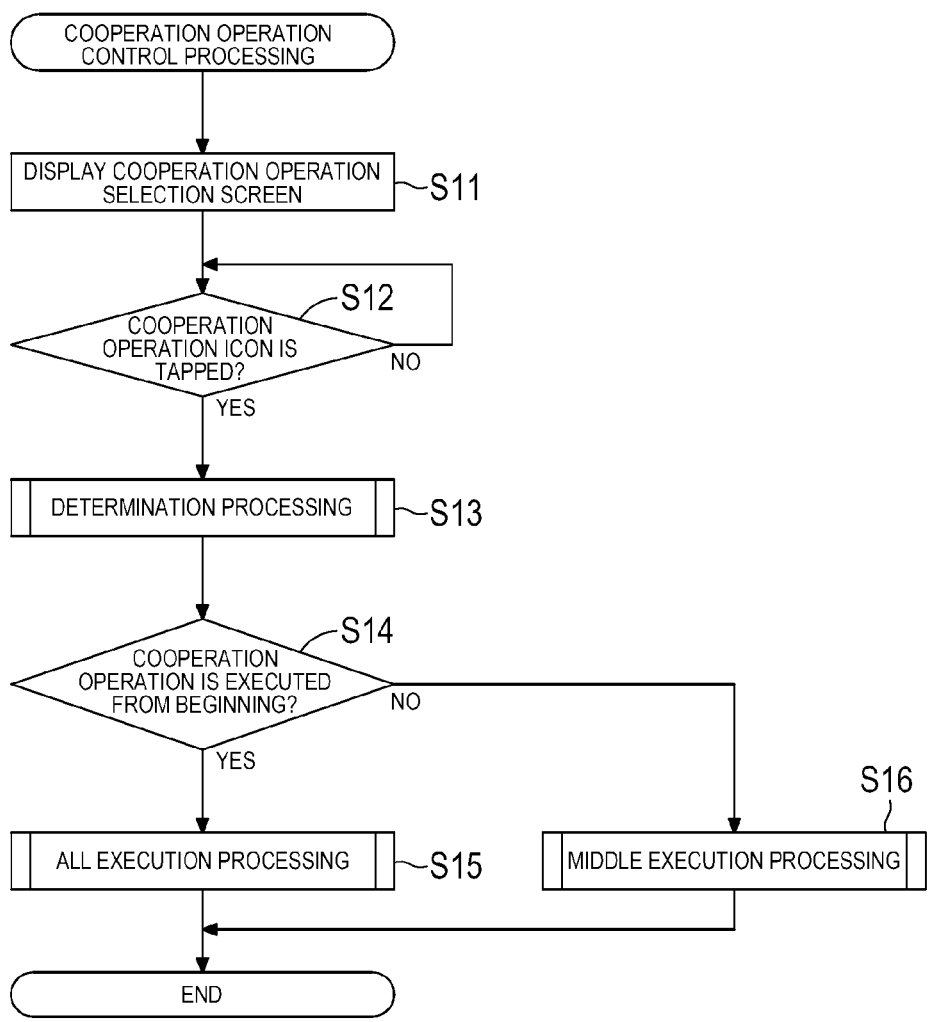
FIG. 4 is a flowchart of cooperation operation control processing according to the illustrative embodiment.

As shown in FIG. 2B, the portable terminal 50 mainly has a display unit 53, an operation unit 54, a communication unit 55, a CPU 61, a storage unit 62 and a communication bus 63. Since the display unit 53, the operation unit 54, the communication unit 55, the CPU 61, the storage unit 62 and the communication bus 63, which are included in the portable terminal 50, are common to the display unit 23, the operation unit 24, the communication unit 25, the CPU 31, the storage unit 32 and the communication bus 33, which are included in the complex machine 10, the overlapping descriptions are omitted. The CPU 61 and the storage unit 62 configure an example of the control unit. The portable terminal 50 is an example of the information processing apparatus. However, the specific example of the information processing apparatus is not limited to the portable terminal 50 such as a smart phone, a portable phone and a tablet terminal, and may be a PC (abbreviation of Personal Computer) and the like.

The communication unit 55 is configured to perform communication with the complex machines 10A, 10B, 10C belonging to the LAN 102 and to perform communication with the server apparatus 70 on the Internet 101 via the router 102A. That is, the portable terminal 50 is configured to transmit a variety of data or information to the complex machine 10 or server apparatus 70 through the communication unit 55 and to receive the variety of data or information from the complex machine 10 or server apparatus 70 through the communication unit 55.

The data storage area 62B of the storage unit 62 can store therein a cooperation operation list. The cooperation operation list is a list for defining a cooperation operation of causing a first apparatus to execute a first operation and a second apparatus to execute a second operation after the first operation. For example, as shown in FIGS. 3A and 3B, in the cooperation operation list, a first apparatus and a second apparatus selected from a plurality of apparatuses are associated with apparatus IDs for identifying the apparatuses, operation contents to be executed by the apparatuses and format information. The cooperation operation list is an example of the cooperation operation information.

The cooperation operation list shown in FIG. 3A indicates that the server apparatus 70 identified with an apparatus ID "server A" is caused to execute a first operation "DL" and the complex machine 10C identified with an apparatus ID "MFC-C" is caused to execute a second operation "PRINT". In FIG. 3A, the server apparatus 70 is an example of the first apparatus, and the complex machine 10C is an example of the second apparatus. The cooperation operation list shown in FIG. 3B indicates that the complex machine 10A identified with an apparatus ID "MFC-A" is caused to execute a first operation "SCAN" and the complex machine 10B identified with an apparatus ID "MFC-B" is caused to execute a second operation "PRINT". In FIG. 3B, the complex machine 10A is an example of the first apparatus, and the complex machine 10B is an example of the second apparatus.

The operation content "DL" associated with the server apparatus 70 indicates a first operation of transmitting the target data stored in the server apparatus 70 to the portable terminal 50. The operation content "SCAN" associated with the complex machine 10A indicates a first operation of causing the scanner unit 12 to execute the scan processing and transmitting the target data generated in the scan processing to the portable terminal 50. The operation content "PRINT" associated with the complex machines 10B, 10C indicates a second operation of receiving the target data from the portable terminal 50 and causing the printer unit 11 to execute recording processing of the target data. The first operation is an operation including the transmission of the target data to the portable terminal 50. The second operation is an operation including the reception of the target data from the portable terminal 50.

In the meantime, although not shown, the operation content included in the cooperation operation list may include more detailed content. For example, the operation content "DL" may be added with a data ID of the target data, which is a downloading target, and the like. The operation content "SCAN" may be added with a document size indicating a size of a document, information indicating a color scan or monochrome scan, information indicating a duplex scan or one-sided scan, and the like. Further, the operation content "PRINT" may be added with information indicating a size of a recording sheet, information indicating a number of the recording sheets, information indicating a number of images to be included on one recording sheet, information indicating a duplex print or one-sided print, and the like.

The format information is information indicating a format of the target data that is received by the corresponding first operation. That is, the format information is associated with only the first operation. Although the specific example of the format information is not particularly limited, it may be a file format (for example, JPEG, BMP, GIF and the like) of the target data, a gradation (for example, color, gray scale, monochrome and the like) of an image represented by the target data, and the like. In the meantime, the format information set for the first operation is not limited to one and may be plural. The format information may be a part of the above-described operation contents.

Figure 8A:
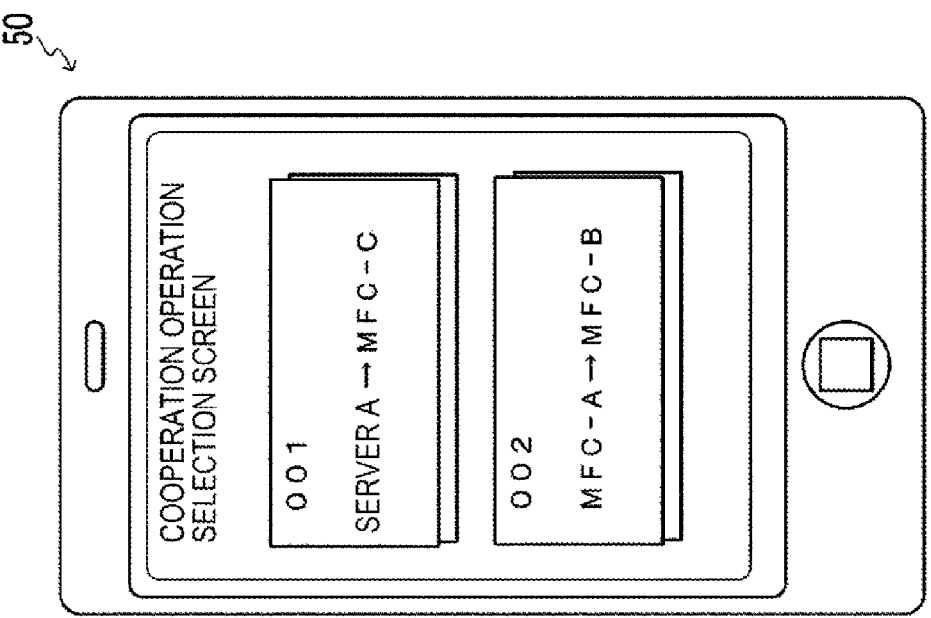

The control program 65 of the portable terminal 50 may be configured to receive a change of the format information included in the cooperation operation list, through a correction receiving screen shown in FIG. 8A, for example. This processing is an example of the change processing. The correction receiving screen shown in FIG. 8A includes the format information registered in the cooperation operation list, an ">" icon for receiving correction of each format information, and an OK icon. When the operation unit 54 receives a user's operation of tapping a position of the ">" icon on the correction receiving screen, the control program 65 receives an input of the corrected format information. Although the specific input method of the format information is not particularly limited, it may be selected from a pull-down menu and the like, for example.

The cooperation operation list can be arbitrarily prepared and edited by a user of the portable terminal 50. The portable terminal 50 may be configured to receive new registration and editing of the cooperation operation list by the user through the display unit 53 and the operation unit 54, for example. A plurality of the cooperation operation lists can be stored in the data storage area 62B. For this reason, the cooperation operation list stored in the data storage area 62B is allotted with a cooperation operation ID for identifying the cooperation operation list. In this illustrative embodiment, the cooperation operation list shown in FIG. 3A is allotted with a cooperation operation ID "001" and the cooperation operation list shown in FIG. 3B is allotted with a cooperation operation ID "002". The cooperation operation ID is an example of the operation identification information.

As shown in FIG. 3C, the data storage area 62B is configured to associate and store therein the cooperation operation ID, the target data, the format information and the resumption information. The target data is received from the first apparatus by the cooperation operation identified with the corresponding cooperation operation ID. The format information is format information of the first operation included in the cooperation operation list identified with the corresponding cooperation operation ID. The resumption information is information indicating a leading position of the target data to be transmitted to the second apparatus. In the meantime, the specific processing of storing the cooperation operation ID, the target data, the format information and the resumption information in the data storage area 62B shown in FIG. 3C will be described later with reference to FIG. 6.

[Server Apparatus 70]

The server apparatus 70 is a storage server configured to store therein data, for example. Although the specific example of the server apparatus 70 is not particularly limited, the server apparatus 70 is an apparatus configured to provide services such as 'Dropbox (registered trademark)', 'Google Docs (registered trademark)', 'Evernote (registered trademark)' and the like. The present invention is not limited to the configuration where the server apparatus 70 is connected to the Internet 101, and the server apparatus 70 may be a local storage server belonging to the LAN 102.

[Operations of Cooperation System 100]

The operations of the cooperation system 100 are described with reference to FIGS. 4 to 10. In the cooperation system 100 of this illustrative embodiment, when an instruction from a user is received, the portable terminal 50 resumes the interrupted cooperation operation or re-executes the ended cooperation operation. Meanwhile, in below descriptions, the cooperation operation is executed in accordance with the cooperation operation list shown in FIG. 3B. It is assumed that the target data includes a plurality of images to be recorded on each of a plurality of recording sheets. Further, it is assumed that the second operation "PRINT", which is executed by the complex machine 10B, is to sequentially record a plurality of images represented by the target data on the recording sheets.

Figure 8B:
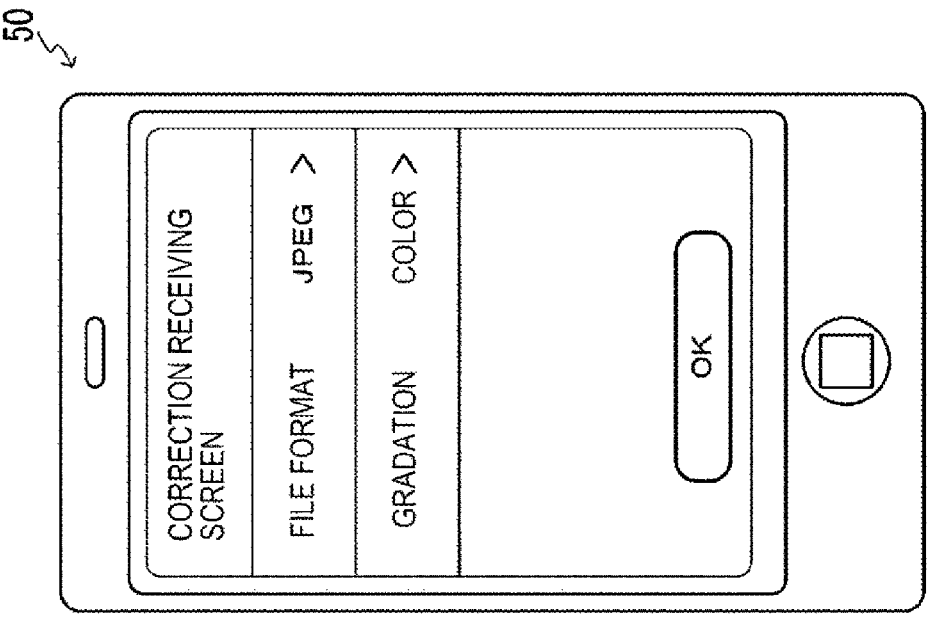

First, the control program 65 of the portable terminal 50 displays a cooperation operation selection screen on the display unit 53 (S11). FIG. 8B illustrates an example of the cooperation operation selection screen. The cooperation operation selection screen shown in FIG. 8B includes cooperation operation icons indicating one or more cooperation operation lists stored in the data storage area 62B. The cooperation operation icon is denoted with a cooperation operation ID for identifying the cooperation operation list stored in the data storage area 62B.

Then, when the operation unit 54 receives a user's operation of tapping a position of the cooperation operation icon corresponding to the cooperation operation list shown in FIG. 3B (S12: Yes), the control program 65 executes determination processing. The processing of step S12 is an example of the reception processing of receiving a start instruction to start the cooperation operation. The determination processing is processing of determining whether to execute the selected cooperation operation from the beginning or from the middle. The determination processing of this illustrative embodiment is described in detail with reference to FIG. 5.

First, the control program 65 determines whether the target data associated with the cooperation operation ID "002" denoted for the cooperation operation icon tapped in step S12 is stored in the data storage area 62B shown in FIG. 3C (S21). When it is determined that the target data is not stored in the data storage area 62B (S21: No), the control program 65 determines that the cooperation operation is to be executed from the beginning (S22).

On the other hand, when it is determined that the target data is stored in the data storage area 62B (S21: Yes), the control program 65 determines whether the format information identified with the cooperation operation ID "002" and included in the cooperation operation list is changed (S23). For example, in step S23, the control program 65 compares the format information (hereinafter, referred to as 'first format information') associated with the target data in the data storage area 62B shown in FIG. 3C and the format information (hereinafter, referred to as 'second format information') associated with the cooperation operation ID "002" in the data storage area 62B shown in FIG. 3B.

That is, in step S23, the control program 65 determines whether the format information of the corresponding cooperation operation list is changed after the target data is stored in the data storage area 62B. At this time, in step S23, the present invention is not limited to the configuration of comparing the first format information and the second format information. For example, the control program 65 may be configured to store first time information, which indicates time at which the target data is stored in the data storage area 62B, in the data storage area 62B shown in FIG. 3C in association with the target data. The control program 65 may be configured to add second time information, which indicates time at which a change of the format information is received through the correction receiving screen shown in FIG. 8A, to the cooperation operation list. When the second time information indicates time later than the first time information, the control program 65 may determine that the format information has been changed.

Then, when the first format information and the second format information are different from each other (S23: Yes), the control program 65 determines whether the target data stored in the data storage area 62B shown in FIG. 3C can be converted into a format represented by the second format information (S24). For example, when the first format information is "JPEG" and the second format information is "GIF", the control program 65 determines that the target data can be converted. As another example, when the first format information is "monochrome" and the second format information is "color", the control program 65 determines that the target data cannot be converted. In the meantime, the format can be converted depending on a function installed in the control program 65 or portable terminal 50.

Then, when it is determined that the target data cannot be converted (S24: No), the control program 65 determines that the cooperation operation is to be executed from the beginning (S25). In step S25, the control program 65 may delete the target data associated with the cooperation operation ID "002" from the data storage area 62B shown in FIG. 3C. On the other hand, when it is determined that the target data can be converted (S24: Yes), the control program 65 converts the target data into a format represented by the second format information (S26), associates the converted target data with the cooperation operation ID "002" and stores the same in the data storage area 62B. The processing of step S26 is an example of the conversion processing. In the meantime, since the target data can be converted using the well-known method, the detailed description thereof is omitted. The control program 65 determines that the cooperation operation is to be executed from the middle (S27).

Figure 9A:
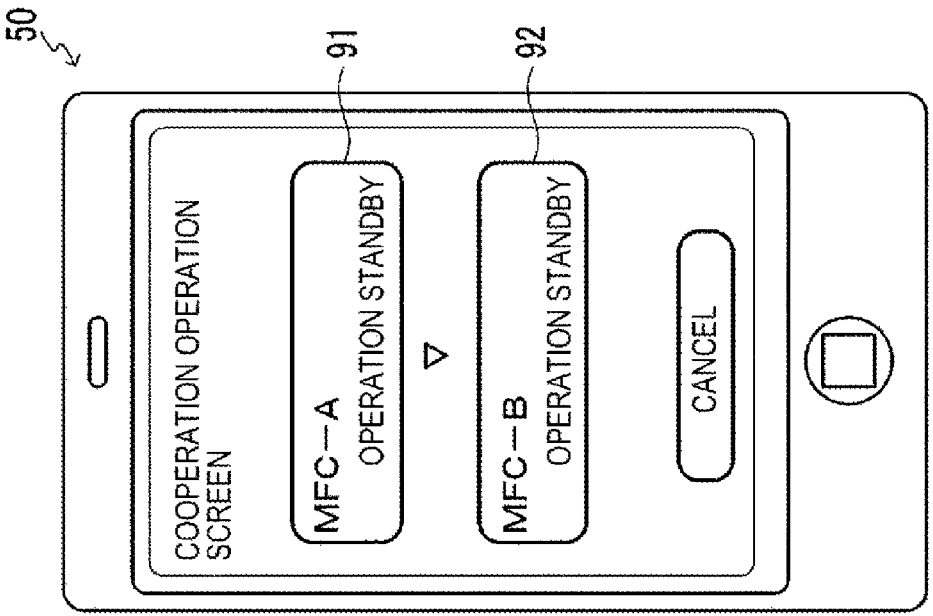

When it is determined that the first format information and the second format information are the same (S23: Yes), the control program 65 displays an inquiry screen on the display unit 53 (S28). FIG. 9A illustrates an example of the inquiry screen. The inquiry screen shown in FIG. 9A includes a message 'Will you re-execute the cooperation operation executed just before?', an OK icon and a cancel icon. The processing of step S28 is an example of the inquiry processing.

Then, when the operation unit 54 receives a user's operation of tapping a position of the OK button on the inquiry screen (S29: OK), the control program 65 determines that the cooperation operation is to be executed from the middle (S30). On the other hand, when the operation unit 54 receives a user's operation of tapping a position of the cancel button on the inquiry screen (S25: Cancel), the control program 65 determines that the cooperation operation is to be executed from the beginning (S31). In step S31, the control program 65 may delete the target data associated with the cooperation operation ID "002" from the data storage area 62B shown in FIG. 3C.

Returning to FIG. 4, when it is determined that the cooperation operation is to be executed from the beginning (S14: Yes), the control program 65 executes all execution processing (S15). The all execution processing is processing of executing the cooperation operation from the beginning More specifically, the all execution processing is to execute the first operation and second operation included in the cooperation operation. On the other hand, when it is determined that the cooperation operation is to be executed from the middle (S14: No), the control program 65 executes middle execution processing (S16). The middle execution processing is processing of executing the cooperation operation from the middle. More specifically, the middle execution processing is to execute only the second operation included in the cooperation operation.

Figure 6:
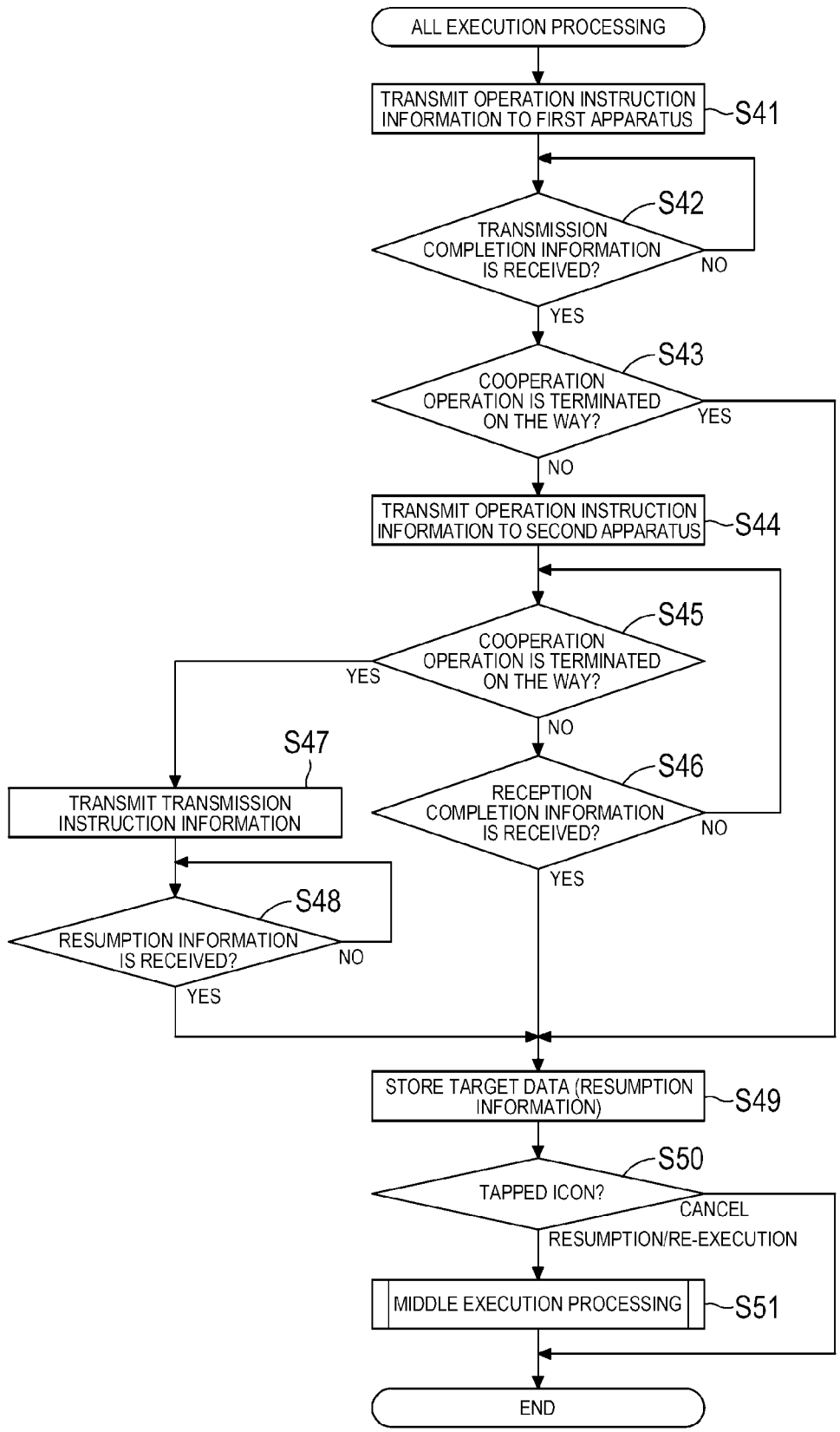
FIG. 6 is a flowchart of all execution processing according to the illustrative embodiment.
Figure 9B:
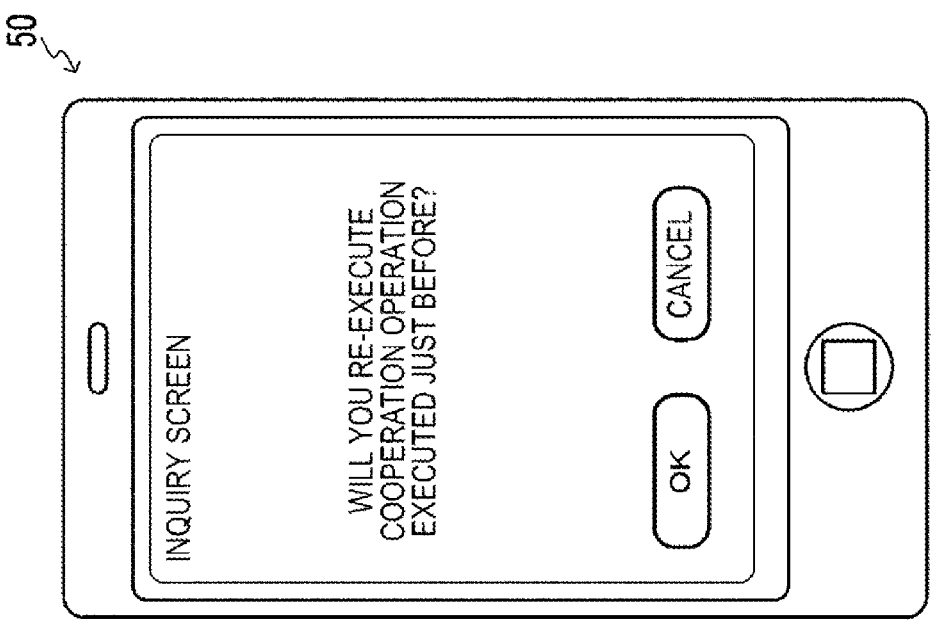

The all execution processing is described in detail with reference to FIG. 6. First, the control program 65 displays a cooperation operation screen on the display unit 53. FIG. 9B illustrates an example of the cooperation operation screen. The cooperation operation screen shown in FIG. 9B includes status images 91, 92 corresponding to the first apparatus and second apparatus included in the cooperation operation list, and a cancel icon for receiving an instruction to stop the cooperation operation.

In the status images 91, 92, the apparatus IDs included in the cooperation operation list and progressing statuses of operations that are executed by the apparatuses identified by the apparatus IDs are indicated. That is, the information indicated in the status images 91, 92 is changed as the cooperation operation progresses. The status images 91, 92 are arranged in accordance with an execution sequence of the cooperation operation list. In the cooperation operation screen shown in FIG. 9B, the status image 91 represents a progressing status of the first operation "DL" that is executed by the complex machine 10A identified with the apparatus ID "MFC-A". The status image 92 represents a progressing status of the second operation "PRINT" that is executed by the complex machine 10B identified with the apparatus ID "MFC-B".

Then, the control program 65 transmits operation instruction information to the complex machine 10A through the communication unit 55 (S41). The operation instruction information is information for causing an apparatus of a transmission destination to execute a corresponding operation. The processing of step S41 and step S44, which will be described later, is an example of the operation instruction processing. The control program 65 changes the progressing status of the status image 91 on the cooperation operation screen from "operation standby" to "being operating".

Then, the control program 65 holds execution of next processing and thereafter until transmission completion information is received from the complex machine 10A through the communication unit 55 (S42: No). The control program 65 sequentially receives the target data divided in plural from the complex machine 10A through the communication unit 55 and stores the same in the data storage area 62B until the transmission completion information is received from the complex machine 10A (S42: No). In the meantime, the target data described here may be stored in the RAM because it has only to store the target data only until the target data is completely received. The processing of receiving the target data from the complex machine 10A having transmitted the operation instruction information is an example of the data receiving processing.

The transmission completion information is information indicating the transmission completion of the target data to the portable terminal 50 of the first operation that is to be executed by the first apparatus. That is, when the transmission completion information is received from the first apparatus through the communication unit 55, the control program 65 determines that the reception of the target data from the first apparatus is completed. Although the specific example of the transmission completion information is not particularly limited, it may be a packet in which "ON" is set in a FIN flag of a TCP header, for example.

Then, when the transmission completion information is received from the complex machine 10A through the communication unit 55 (S42: Yes), the control program 65 changes the progressing status of the status image 91 on the cooperation operation screen from "being operating" to "operation completed". The control program 65 determines whether the cooperation operation is terminated on the way after the transmission completion information is received from the complex machine 10A (S43). In step S43, the case where the cooperation operation is terminated on the way is a case where the operation unit 54 receives a user's operation of tapping a position of the cancel icon on the cooperation operation screen, for example.

Then, when it is determined that the cooperation operation is not terminated on the way (S43: No), the control program 65 transmits the operation instruction information to the complex machine 10B through the communication unit 55 (S44). The control program 65 changes the progressing status of the status image 92 on the cooperation operation screen from "operation standby" to "being operating". Further, the control program 65 sequentially transmits the target data divided in plural to the complex machine 10B through the communication unit 55 until reception completion information is received from the complex machine 10B through the communication unit 55 (S46: No). The processing of transmitting the target data in step S46 is an example of the data transmitting processing.

The reception completion information is information indicating the reception completion of the target data from the portable terminal 50 under the second operation. That is, when the reception completion information is received from the complex machine 10B through the communication unit 55 (S46: Yes), the control program 65 determines that the transmission of the target data to the complex machine 10B is completed, and ends the cooperation operation control processing. Although the specific example of the reception completion information is not particularly limited, it may be a packet in which "ON" is set for a FIN flag and an ACK flag of the TCP header, for example.

When the cooperation operation is terminated on the way until the reception completion information is received from the complex machine 10B through the communication unit 55 (S26: No&S45: Yes), the control program 65 changes the progressing status of the status image 92 on the cooperation operation screen from "being operating" to "being interrupted", as shown in FIG. 10A. The control program 65 adds a 'resume' icon for receiving an instruction to resume the cooperation operation under interruption to the cooperation operation screen.

In step S45, the case where the cooperation operation is terminated on the way is a case where the operation unit 54 receives a user's operation of tapping a position of the cancel icon on the cooperation operation screen, a case where interruption information indicating that the second operation cannot be continued is received from the complex machine 10B through the communication unit 55, and the like. The interruption information may be information indicating that there is no recording sheet or ink for executing the second operation "PRINT".

Then, the control program 65 transmits transmission instruction information to the complex machine 10B through the communication unit 55 (S47). The transmission instruction information is information for transmitting resumption information to the complex machine 10B, which is a transmission destination. The resumption information is information for specifying a resumption image of a plurality of images, which is to be recorded on a next recording sheet. In the meantime, the resumption information may be any information inasmuch as it can specify a resumption image, for example, information for specifying an image finally recorded on the recording sheet. In the meantime, the control program 35 of the complex machine 10B may transmit the interruption information including the resumption information to the portable terminal 50 through the communication unit 25. In this case, the processing of step S47 is omitted.

Then, when the resumption information is received from the complex machine 10B through the communication unit 55 (S48: Yes), the control program 65 associates the cooperation operation ID "002" denoted for the cooperation operation icon tapped in step S12, the target data received from the complex machine 10A in step S42, the format information included in the cooperation operation list identified with the cooperation operation ID "002" and the resumption information received from the complex machine complex machine 10B in step S48 and stores the same in the data storage area 62B shown in FIG. 3C (step S49). The processing of step S49 is an example of the storing control processing.

When the cooperation operation is terminated on the way before the operation instruction information is transmitted to the complex machine 10B (S43: Yes), the control program 65 adds a 'resume' icon for receiving an instruction to resume the cooperation operation under interruption to the cooperation operation screen, as shown in FIG. 10B. The control program 65 skips over steps S44 to S48 and executes the storing control processing (S49). At this time, in the storing control processing, the resumption information is not stored in the data storage area 62B shown in FIG. 3C.

Further, when the reception completion information is received from the complex machine 10B through the communication unit 55 (S46: Yes), the control program 65 changes the progressing status of the status image 92 from "being operating" to "operation completed", as shown in the cooperation operation screen of FIG. 10C. The control program 65 adds a 're-execution' icon for receiving an instruction to re-execute the cooperation operation executed just before to the cooperation operation screen. Further, the control program 65 skips over steps S47, S48 and executes the storing control processing (S49). At this time, in the storing control processing, the resumption information is not stored in the data storage area 62B shown in FIG. 3C.

Then, when the operation unit 54 receives a user's operation of tapping a position of the 'resume' icon on the cooperation operation screen shown in FIGS. 10A and 10B or a position of the 're-execution' icon on the cooperation operation screen shown in FIG. 10C (S50: resumption/re-execution), the control program 65 executes middle execution processing (S51). On the other hand, when the operation unit 54 receives a user's operation of tapping a position of the 'cancel' icon on the cooperation operation screen shown in FIG. 10 (S50: cancel), the control program 65 skips over step S51 and ends the all execution processing. The processing of step S51 is another example of the inquiry processing.

Figure 7:
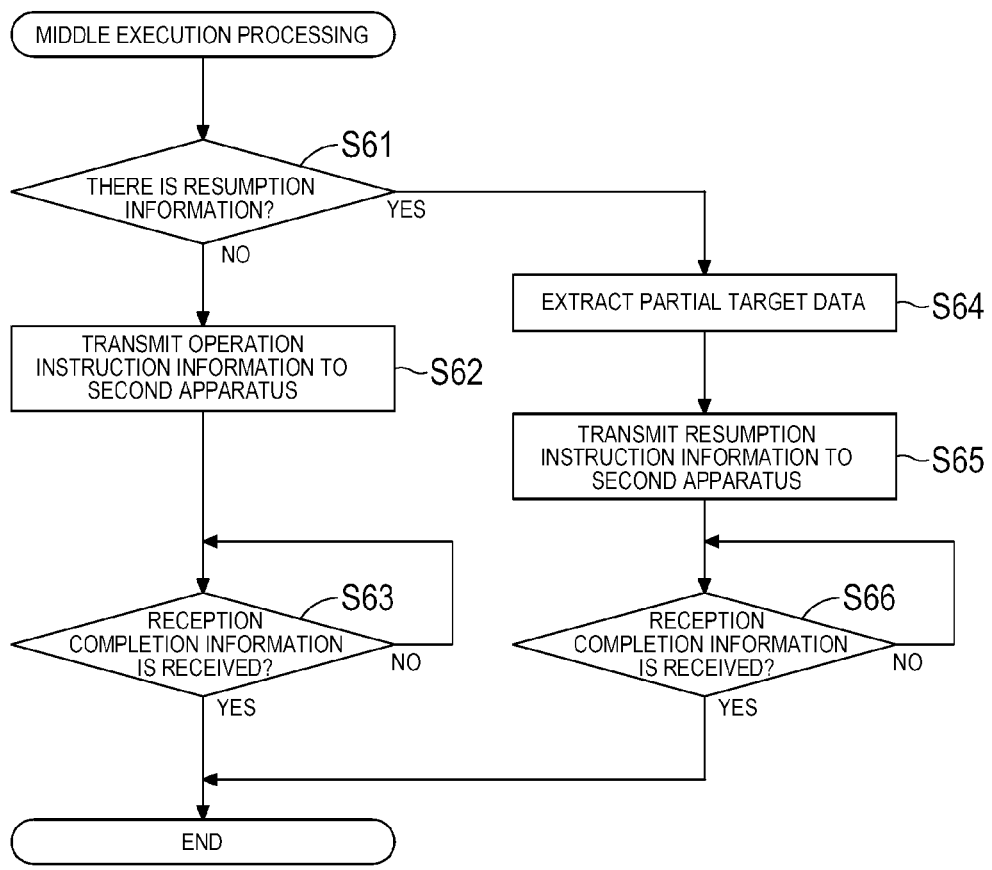
FIG. 7 is a flowchart of middle execution processing according to the illustrative embodiment.

The middle execution processing is described in detail with reference to FIG. 7. In the meantime, the middle execution processing that is executed in step S16 of FIG. 4 and the middle execution processing that is executed in step S51 of FIG. 6 are common processing. In the middle execution processing, the control program 65 displays the cooperation operation screen on the display unit 53.

First, when the resumption information associated with the cooperation operation ID "002" is not stored in the data storage area 62B (S61: No), the control program 65 transmits the operation instruction information to the complex machine 10B through the communication unit 55 (S62). Then, the control program 65 sequentially transmits the target data divided in plural to the complex machine 10B through the communication unit 55 until the reception completion information is received from the complex machine 10B through the communication unit 55 (S63: No). In the meantime, the control program 65 transmits the target data from a head thereof, in step S63. That is, the complex machine 10B executes the second operation from the beginning.

On the other hand, when the resumption information associated with the cooperation operation ID "002" is stored in the data storage area 62B (S61: Yes), the control program 65 extracts partial target data from the target data stored in the data storage area 62B in association with the cooperation operation ID "002" (S64). The partial target data is data after the resumption image, which is represented by the resumption information, of the target data.

Then, the control program 65 transmits resumption instruction information to the complex machine 10B through the communication unit 55 (S65). The resumption instruction information is information for resuming an operation interrupted in an apparatus of a transmission destination. Then, the control program 65 sequentially transmits the partial target data divided in plural to the complex machine 10B through the communication unit 55 until the reception completion information is received from the complex machine 10B through the communication unit 55 (S66: No). In the meantime, the control program 65 transmits the target data from the middle, in step S66. That is, the complex machine 10B executes the second operation from the middle.

Operational Effects of Illustrative Embodiment

According to the above illustrative embodiment, when the start instruction of the cooperation operation is received, it is determined in the determination processing whether to execute the cooperation operation from the beginning or from the middle (S13). When it is necessary to acquire the target data from the first apparatus, the cooperation operation is executed from the beginning, and when it is possible to use the target data stored in the data storage area 62B, the cooperation operation is executed from the middle.

According to the above illustrative embodiment, when the cooperation operation is normally completed (S46: Yes), the 're-execution' icon for receiving the re-execution instruction of the cooperation operation is displayed on the cooperation operation screen. When the position of the 're-execution' icon is tapped, the cooperation operation is re-executed using the target data stored in the data storage area 62B.

In this way, since the cooperation operation can be executed with the first operation being omitted, it is possible to improve the throughput of the cooperation operation that is repeatedly executed. Meanwhile, in step S16, the case where the middle execution processing is executed is a case where the cooperation operation executed in past times is re-executed, i.e., a case where the same cooperation operation is executed after the position of the 'cancel' icon on the cooperation operation screen shown in FIG. 10 is tapped. That is, the cooperation operation executed in past times may be normally completed or may be terminated on the way when the reception of the target data from the first apparatus is completed.

According to the above illustrative embodiment, when the cooperation operation is terminated on the way (S43: Yes) after the reception of the target data from the first apparatus is terminated and before the operation instruction information is transmitted to the second apparatus, the 'resume' icon for receiving the resumption instruction of the cooperation operation is displayed on the cooperation operation screen. Further, according to the above illustrative embodiment, when the cooperation operation is terminated on the way during the transmission of the target data to the second apparatus (S45: Yes), the 'resume' icon for receiving the resumption instruction of the cooperation operation is displayed on the cooperation operation screen. When the position of the 'resume' icon is tapped, the cooperation operation is resumed using the target data stored in the data storage area 62B.

In this way, when resuming the interrupted cooperation operation after the reception of the target data from the first apparatus is completed, it is not necessary to cause the first apparatus to re-execute the first operation, so that the throughput of the cooperation operation is improved. Further, when resuming the interrupted cooperation operation during the transmission of the target data to the second apparatus, it is possible to resume the second operation from the middle on the basis of the resumption information, so that the throughput of the cooperation operation is further improved.

In the meantime, when the interrupted second operation "PRINT" is resumed from the middle on the basis of the resumption information, like the above illustrative embodiment, it is possible to suppress the same image from being redundantly recorded on the plurality of recording sheets in the complex machine 10B. However, the second operation that is resumed on the basis of the resumption information is not limited to "PRINT". For example, a second operation of storing the target data received from the portable terminal 50 in the storage unit may be resumed on the basis of the resumption information.

Further, it is possible to execute the cooperation operation with the user's desired target data by determining whether to execute the all execution processing or middle execution processing on the basis of a variety of determination standards. At this time, the determination standards used in the determination processing are not limited to steps S21, S23, S24, S29, and the determination standard shown in FIG. 11 may be adopted, for example.

Modified Embodiments

Figure 5:
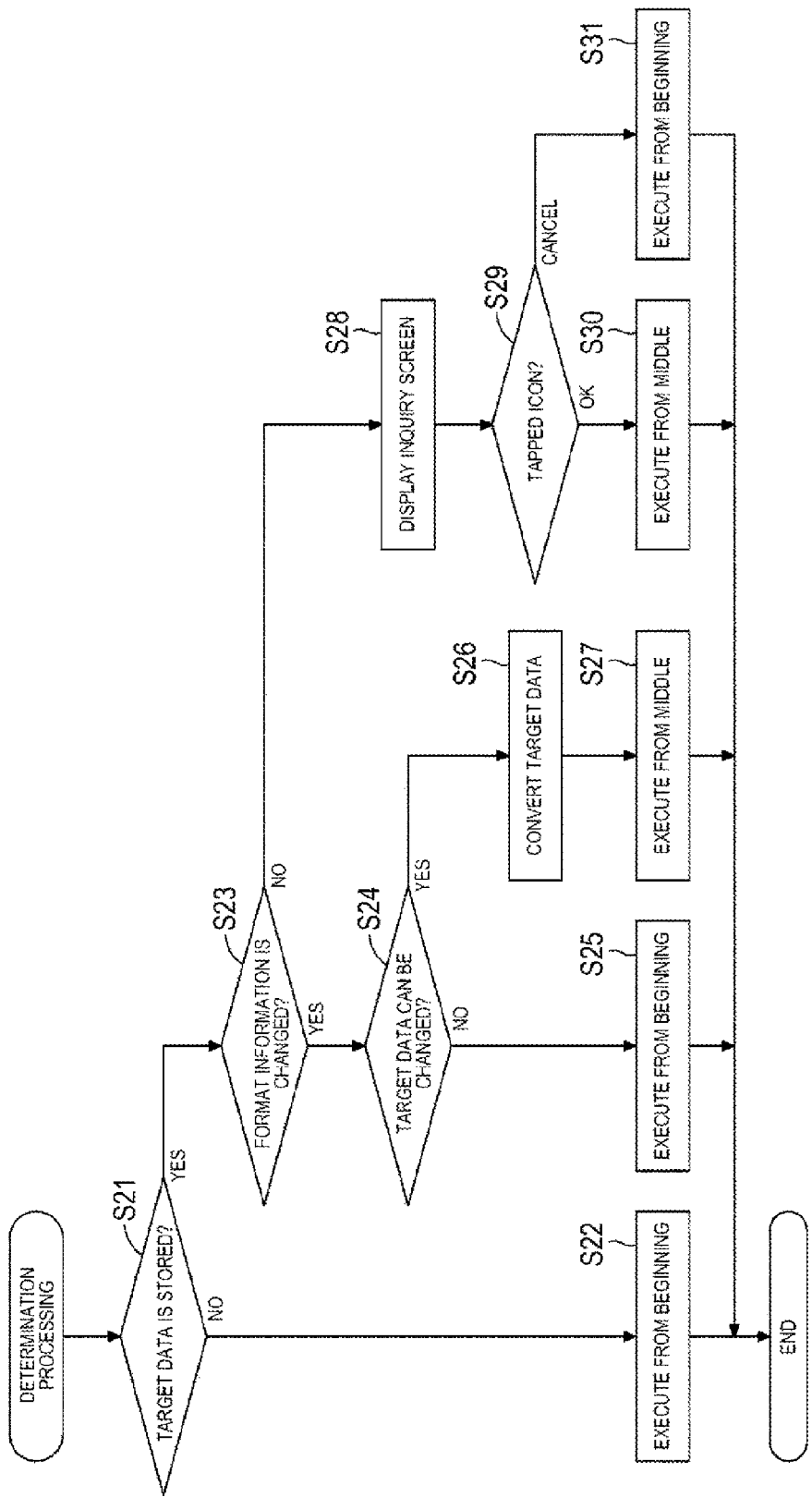
FIG. 5 is a flowchart of determination processing according to the illustrative embodiment.
Figure 11:
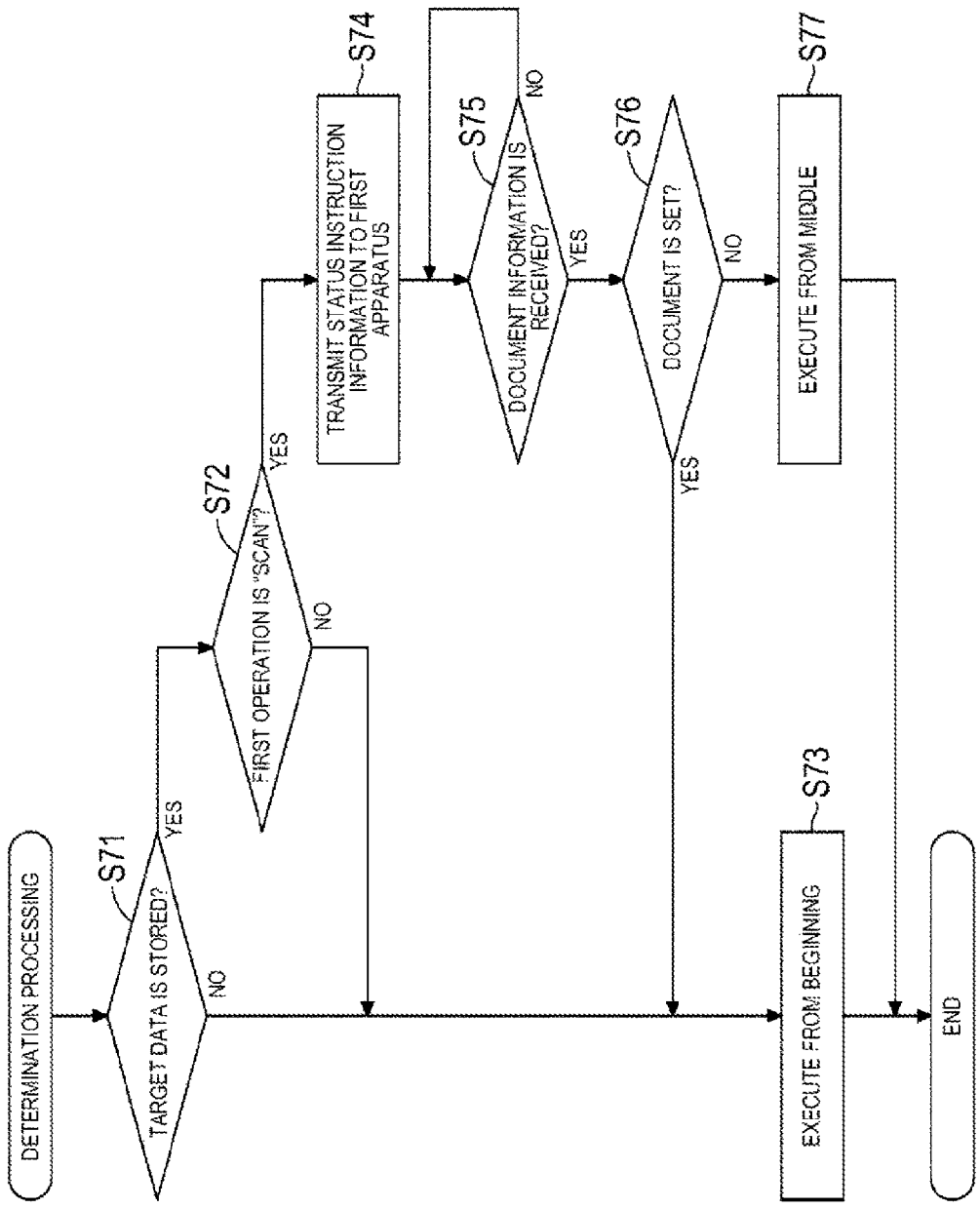
FIG. 11 is a flowchart of the determination processing according to a modified embodiment.

The determination processing of a modified embodiment is described with reference to FIG. 11. In the meantime, the descriptions about the processing common to the determination processing shown in FIG. 5 are omitted, and the differences are described. It is assumed that the determination standards shown in FIGS. 5 and 11 can be combined with any combination.

First, when the target data associated with the cooperation operation ID "002" is stored in the data storage area 62B (S71: Yes), the control program 65 determines whether the first operation of the cooperation operation list identified with the cooperation operation ID "002" is "SCAN" (S72). The processing of step S71 is common to the processing of step S21 shown in FIG. 5. Then, when it is determined that the first operation is not "SCAN" (S72: No), the control program 65 determines that the cooperation operation is to be executed from the beginning (S73). Alternatively, when it is determined that the first operation is not "SCAN" (S72: No), the control program 65 may execute the processing of step S23 and thereafter in the determination processing shown in FIG. 5.

On the other hand, when it is determined that the first operation is "SCAN" (S72: Yes), the control program 65 transmits status instruction information to the complex machine 10A through the communication unit 55 (S74). The status instruction information is information for transmitting document information to the complex machine 10A, which is a transmission destination. The document information is information indicating whether a document is set on the scanner unit 12 of the complex machine 10A. In other words, the document information is information indicating whether a preparation for reading a new document to generate target data is made in the complex machine 10A.

Then, the control program 65 receives the document information from the complex machine 10A through the communication unit 55 (S75: Yes). The processing of step S75 is an example of information receiving processing. Then, when the document information indicates that a document is set on the complex machine 10A (S76: Yes), the control program 65 determines that the cooperation operation is to be executed from the beginning (S73). On the other hand, when the document information indicates that a document is not set on the complex machine 10A (S76: No), the control program 65 determines that the cooperation operation is to be executed from the middle (S77).

According to the determination processing of the modified embodiment, when the document is not set on the first apparatus at the time that the start instruction is received, it may be assumed that the user wants to reuse the target data stored in the data storage area 62B. As a result, it is possible to effectively re-execute the cooperation operation.

Meanwhile, in the above illustrative embodiment, the variety of programs stored in the program storage area 32A, 62A of the storage unit 32, 62 of the complex machine 10 or portable terminal 50 are executed by the CPU 31, 61, so that the respective processing to be executed by the control unit of the present invention is implemented. However, the configuration of the control unit is not limited thereto, and a part or all of the configurations may be implemented by hardware such as IC (abbreviation of Integrated Circuit).

Further, the present invention can be implemented not only by the complex machine 10 or portable terminal 50 but also by a program configured to cause the complex machine 10 or portable terminal 50 to execute the processing. The program may be provided with being recorded in a non-transitory recording medium. The non-transitory recording medium may include a storage unit mounted to a server that can be connected to the complex machine 10 or portable terminal 50 through the communication network, in addition to a CD-ROM, a DVD-ROM and the like. The program stored in the storage unit of the server apparatus may be delivered through the communication network such as the Internet, as information or signal representing the program.

What is claimed is:

1. A non-transitory computer readable recording medium storing a computer program for an information processing apparatus comprising a communication interface configured to perform communication with a plurality of apparatuses through a communication network, a user interface configured to receive a user operation and a storage, the computer program when executed by a processor of the information processing apparatus causing the information processing apparatus to execute:

first instruction receiving processing of receiving a first instruction of selecting first cooperation identification information from the user interface, wherein the first cooperation identification information is one of a plurality of cooperation identification information stored in the storage, each of the plurality of cooperation identification information indicates a cooperation operation including a first part operation and a second part operation, the first part operation causes a first apparatus to prepare target data and transmit the prepared target data to the information processing apparatus, and the second part operation causes a second apparatus to receive the target data from the information processing apparatus and process the received target data;

after receiving the first instruction, a first processing of causing the first apparatus to execute the first part operation included in the cooperation operation, the cooperation operation being indicated by the selected first cooperation identification information, the first apparatus being selected from the plurality of apparatuses for the cooperation operation;

after the first processing, a second processing of causing the second apparatus to execute the second part operation included in the selected first cooperation identification information, the cooperation operation being indicated by the selected first cooperation identification information, the second apparatus being selected from the plurality of apparatuses for the cooperation operation;

when the cooperation operation is terminated in a state that reception of the target data from the first apparatus in the first part operation is completed and transmission of the target data to the second apparatus in the second part operation is not completed, storing control processing of associating the target data with the first cooperation identification information and storing the target data in the storage, wherein the storing control processing is not executed when reception of the target data from the first apparatus in the first part operation is completed and transmission of the target data to the second apparatus in the second part operation is completed;

second instruction receiving processing of receiving a second instruction of selecting the cooperation operation from the user interface;

after receiving the second instruction, determination processing of determining whether the target data associated with the first cooperation identification information is stored in the storage;

data transmitting processing of transmitting the target data to the second apparatus through the communication interface when it is determined in the determination processing that the target data associated with the first cooperation identification information is stored in the storage;

when it is determined in the determination processing that the target data is not stored in the storage, a third processing of causing the first apparatus to execute the first part operation included in the cooperation operation, the cooperation operation being indicated by the selected first cooperation identification information, the first apparatus being selected from the plurality of apparatuses for the cooperation operation; and after the third processing, a fourth processing of causing the second apparatus to execute the second part operation included in the selected first cooperation identification information, the cooperation operation being indicated by the selected first cooperation identification information, the second apparatus being selected from the plurality of apparatuses for the cooperation operation.

2. The non-transitory computer readable recording medium according to claim 1, wherein the program is configured to cause the information processing apparatus to execute:

after receiving the second instruction, inquiry processing of asking a user whether to execute the cooperation operation by using the target data stored in the storage when it is determined in the determination processing that the target data is stored in the storage, and the data transmitting processing when the user interface receives an execution instruction to execute the cooperation operation in the inquiry processing.

3. The non-transitory computer readable recording medium according to claim 1, wherein the first operation identification information and format information representing a format of the target data transmitted to the information processing apparatus by the cooperation operation identified by the first operation identification information are associated with each other and stored in the storage, and after receiving the second instruction, the program causes the information processing apparatus to execute change processing of allowing the user interface to receive a user operation of changing the format information stored in the storage, when it is determined that the target data is stored in the storage, it is determined in the determination processing whether the format information associated which is the same as the first operation identification information associated with the target data is changed after execution of the storing control processing, and when it is determined in the determination processing that the format information is not changed, the program causes the information processing apparatus to execute the data transmitting processing.

4. The non-transitory computer readable recording medium according to claim 3, wherein when it is determined that the format information associated with the first operation identification information is changed, it is determined in the determination processing whether the target data stored in the storage in association with the first operation identification information can be converted into a format represented by the changed format information, when it is determined in the determination processing that the target data can be converted, the program causes the information processing apparatus to execute conversion processing of converting the target data into the format represented by the format information, and the data transmitting processing of transmitting the target data converted in the conversion processing to the second apparatus through the communication interface.

5. The non-transitory computer readable recording medium according to claim 1, wherein the first part operation is to read an image recorded on a document set on the first apparatus to form the target data, and the program is configured to cause the information processing apparatus to execute:

information receiving processing of receiving document information indicating whether the document is set on the first apparatus from the first apparatus through the communication interface when it is determined in the determination processing that the target data is stored in the storage, and the data transmitting processing when the document information indicating that a document is not set on the first apparatus is received in the information receiving processing.

6. The non-transitory computer readable recording medium according to claim 1, wherein the target data comprises a plurality of images to be recorded on each of a plurality of recording sheets, the second part operation is to sequentially record the plurality of images represented by the target data onto the recording sheets, and in the storing control processing that is executed when the cooperation operation is terminated during execution of the second part operation, the information processing apparatus associates resumption information received from the second apparatus through the communication interface with the target data and stores the resumption information in the storage, the resumption information being information for specifying a resumption image of the plurality of images, which is to be recorded onto a next recording sheet; and in the data transmitting processing, when the resumption information is stored in the storage, the information processing apparatus transmits partial target data of the resumption image and a sequential image of the target data stored in the storage, to the second apparatus through the communication interface, the partial target data being represented by the resumption information.

7. The non-transitory computer readable recording medium according to claim 1, wherein the program is configured to cause the information processing apparatus to execute:

inquiry processing of asking a user whether to execute the cooperation operation by using the target data stored in the storage in the storing control processing when the cooperation operation is terminated in a state that reception of the target data from the first apparatus is completed and transmission of the target data to the second apparatus is not completed, and the data transmitting processing when the user interface receives an execution instruction to execute the cooperation operation in the inquiry processing.

8. An information processing apparatus comprising:
a communication interface configured to perform communication with a plurality of apparatuses through a communication network;
a user interface configured to receive a user operation;
a processor; and
a storage storing a computer readable program, when executed by the processor, causing the information processing apparatus to execute:
  first instruction receiving processing of receiving a first instruction of selecting first cooperation identification information from the user interface, wherein the first cooperation identification information is one of a plurality of cooperation identification information stored in the storage, each of the plurality of cooperation identification information indicates a cooperation operation including a first part operation and a second part operation, the first part operation causes a first apparatus to prepare target data and transmit the prepared target data to the information processing apparatus, and the second part operation causes a second apparatus to receive the target data from the information processing apparatus and process the received target data;
  after receiving the first instruction, a first processing of causing the first apparatus to execute the first part operation included in the cooperation operation, the cooperation operation being indicated by the selected first cooperation identification information, the first apparatus being selected from the plurality of apparatuses for the cooperation operation;
  after the first processing, a second processing of causing the second apparatus to execute the second part operation included in the selected first cooperation identification information, the cooperation operation being indicated by the selected first cooperation identification information, the second apparatus being selected from the plurality of apparatuses for the cooperation operation;
  when the cooperation operation is terminated in a state that reception of the target data from the first apparatus in the first part operation is completed and transmission of the target data to the second apparatus in the second part operation is not completed, storing control processing of associating the target data with the first cooperation identification information and storing the target data in the storage, wherein the storing control processing is not executed when reception of the target data from the first apparatus in the first part operation is completed and transmission of the target data to the second apparatus in the second part operation is completed;
  second instruction receiving processing of receiving a second instruction of selecting the cooperation operation from the user interface;
  after receiving the second instruction, determination processing of determining whether the target data associated with the first cooperation identification information is stored in the storage;
  data transmitting processing of transmitting the target data to the second apparatus through the communication interface when it is determined in the determination processing that the target data associated with the first cooperation identification information is stored in the storage;
  when it is determined in the determination processing that the target data is not stored in the storage, a third processing of causing the first apparatus to execute the first part operation included in the cooperation operation, the cooperation operation being indicated by the selected first cooperation identification information, the first apparatus being selected from the plurality of apparatuses for the cooperation operation; and
  after the third processing, a fourth processing of causing the second apparatus to execute the second part operation included in the selected first cooperation identification information, the cooperation operation being indicated by the selected first cooperation identification information, the second apparatus being selected from the plurality of apparatuses for the cooperation operation.

9. A cooperation system comprising:
a first apparatus;
a second apparatus, and
an information processing apparatus comprising:
a communication interface configured to perform communication with a plurality of apparatuses through a communication network;
a user interface configured to receive a user operation,
a processor;
a storage storing a computer readable program, when executed by the processor, causing the information processing apparatus to execute:
  first instruction receiving processing of receiving a first instruction of selecting first cooperation identification information from the user interface, wherein the first cooperation identification information is one of a plurality of cooperation identification information stored in the storage, each of the plurality of cooperation identification information indicates a cooperation operation including a first part operation and a second part operation, the first part operation causes the first apparatus to prepare target data and transmit the prepared target data to the information processing apparatus, and the second part operation causes the second apparatus to receive the target data from the information processing apparatus and process the received target data;
  after receiving the first instruction, a first processing of causing the first apparatus to execute the first part operation included in the cooperation operation, the cooperation operation being indicated by the selected first cooperation identification information, the first apparatus being selected from the plurality of apparatuses for the cooperation operation;
  after the first processing, a second processing of causing a second apparatus to execute the second part operation included in the selected first cooperation identification information, the cooperation operation being indicated by the selected first cooperation identification information, the second apparatus being selected from the plurality of apparatuses for the cooperation operation;

when the cooperation operation is terminated in a state that reception of the target data from the first apparatus in the first part operation is completed and transmission of the target data to the second apparatus in the second part operation is not completed, storing control processing of associating the target data with the first cooperation identification information and storing the target data in the storage, wherein the storing control processing is not executed when reception of the target data from the first apparatus in the first part operation is completed and transmission of the target data to the second apparatus in the second part operation is completed;

second instruction receiving processing of receiving a second instruction of selecting the cooperation operation from the user interface;

after receiving the second instruction, determination processing of determining whether the target data associated with the first cooperation identification information is stored in the storage;

data transmitting processing of transmitting the target data to the second apparatus through the communication interface when it is determined in the determination processing that the target data associated with the first cooperation identification information is stored in the storage;

when it is determined in the determination processing that the target data is not stored in the storage, a third processing of causing the first apparatus to execute the first part operation included in the cooperation operation, the cooperation operation being indicated by the selected first cooperation identification information, the first apparatus being selected from the plurality of apparatuses for the cooperation operation; and after the third processing, a fourth processing of causing the second apparatus to execute the second part operation included in the selected first cooperation identification information, the cooperation operation being indicated by the selected first cooperation identification information, the second apparatus being selected from the plurality of apparatuses for the cooperation operation.

* * * * *